United States Patent
Ozzie

(10) Patent No.: US 9,210,143 B2
(45) Date of Patent: Dec. 8, 2015

(54) COMMUNICATIONS SYSTEM

(75) Inventor: Raymond E. Ozzie, Seattle, WA (US)

(73) Assignee: Talko Inc., Seattle, WA (US)

( * ) Notice: Subject to any disclaimer, the term of this patent is extended or adjusted under 35 U.S.C. 154(b) by 226 days.

(21) Appl. No.: 13/472,639

(22) Filed: May 16, 2012

(65) Prior Publication Data

US 2012/0297451 A1 Nov. 22, 2012

Related U.S. Application Data

(60) Provisional application No. 61/486,531, filed on May 16, 2011.

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ............... *H04L 63/08* (2013.01); *H04L 65/00* (2013.01)

(58) Field of Classification Search
CPC ............................... H04L 65/00; H04L 63/08
USPC .................................................... 726/3
See application file for complete search history.

(56) References Cited

U.S. PATENT DOCUMENTS

| | | | | |
|---|---|---|---|---|
| 5,553,071 A * | 9/1996 | Aranguren | .......... | H04L 12/6418 370/433 |
| 2003/0202649 A1 | 10/2003 | Haug, Jr. et al. | | |
| 2004/0068481 A1 | 4/2004 | Seshadri et al. | | |
| 2005/0094646 A1 * | 5/2005 | Lee | .......... | 370/395.52 |
| 2006/0033809 A1 * | 2/2006 | Farley | .......... | H04M 3/428 348/14.01 |
| 2006/0126566 A1 * | 6/2006 | Pekonen | .......... | H04B 7/2656 370/331 |
| 2010/0118699 A9 | 5/2010 | Xiong et al. | | |
| 2010/0325040 A1 | 12/2010 | Etchegoyen | | |
| 2011/0033035 A1 * | 2/2011 | Turner | .......... | H04L 12/1818 379/202.01 |
| 2011/0074909 A1 * | 3/2011 | Sadafule | .......... | H04N 7/147 348/14.1 |
| 2011/0107379 A1 * | 5/2011 | Lajoie | .......... | H04L 65/1016 725/87 |
| 2011/0122863 A1 * | 5/2011 | Balasaygun | .......... | H04M 15/00 370/352 |
| 2012/0040644 A1 | 2/2012 | Naik et al. | | |

FOREIGN PATENT DOCUMENTS

EP 1708467 A1 10/2006
EP 1986432 A2 10/2008

OTHER PUBLICATIONS

International Search Report and Written Opinion mailed Jul. 17, 2012 received in PCT/US2012/038054 (9 pgs.).
International Preliminary Report for International Application No. PCT/US2012/038054, mailed on Nov. 28, 2013.
Extended European Search Report issued on Jan. 19, 2015 in corresponding European Patent Application No. 12786434.6.

* cited by examiner

*Primary Examiner* — Arvin Eskandarnia
(74) *Attorney, Agent, or Firm* — Jeffrey T. Placker; Holland & Knight LLP

(57) ABSTRACT

Methods and systems for integrated communications are provided. In one embodiment, a request to initiate a call via a channel is received. A call participant set associated with the channel is identified. A sequence of communications associated with the call is received. The sequence of communications includes at least a real-time media data type and a posted data type. The sequence of communications is transmitted to the call. Other methods and systems are described.

48 Claims, 11 Drawing Sheets

COMMUNICATIONS SYSTEM

CROSS-REFERENCE TO RELATED APPLICATIONS

This application claims the benefit of U.S. provisional patent application Ser. No. 61/486,531, entitled "COMMUNICATIONS SYSTEM," filed on May 16, 2011, the entire disclosures of all of which applications are incorporated herein by reference.

TECHNICAL FIELD

The present disclosure relates to communications systems, and more particularly relates to multi-data type communications systems.

BACKGROUND OF THE DISCLOSURE

A variety of communications systems and mechanisms are frequently used in both business related and personal interactions. The communications systems that are available can often shape the way people interact with one another. Communication and expression may often have to be forced through an ineffective communication medium. At times, the restrictions provided by the modality of communication, such as audio only, text only, two party-only, synchronous-only or asynchronous-only, etc., can place limitations and restrictions on the expression of ideas. The result may be that individuals may be left with an incomplete or inadequate ability for expression, communication or interaction.

SUMMARY OF THE DISCLOSURE

According to a first implementation, a method may include receiving a request for authentication of a user. An authentication communication may be generated via a third party application associated with the user. The method may also include transmitting the authentication communication to an authentication system.

One or more of the following features may be included. The request for authentication may include a request for authentication associated with the third party application. The third party application may include one or more of an email communication application, an SMS communication application, an instant messaging application, and a social networking application.

Generating the authentication communication may include transmitting an authentication request to the third party application. Generating the authentication communication may include pre-populating a communication content including a user identification. Generating the authentication communication may include pre-populating a communication content including an authentication code. Generating the authentication communication may include pre-populating a communication recipient. Generating the authentication communication may include receiving a user credential associated with a communication application. The method may further include authenticating the user.

According to another implementation, a computer program product includes a computer readable medium having a plurality of instructions stored on it. When executed by a processor, the instructions may cause the processor to perform operations including receiving a request for authentication of a user. Instructions may also be included for generating an authentication communication via a third party application associated with the user. Instructions may further be included for transmitting the authentication communication to an authentication system.

According to another implementation, a method may include receiving a request to initiate a communication with a third party. A plurality of notification options may be provided. A selection of one of the plurality of notification options may be received. A notification may be transmitted to the third party based on, at least in part, the selected one of the plurality of notification options.

One or more of the following features may be included. The method may also include receiving context information associated with the third party. Providing the plurality of notification options may further include providing the context information associated with the third party. The context information may include one or more of a location and a trajectory information. The context information may include an activity information associated with a communication device associated with the third party.

The plurality of notification options may include one or more predefined dialog options. The one or more predefined dialog options may include a suggested communication modality. The one or more predefined dialog options may include a status request.

The method may also include receiving a reply to the notification from the third party. The method may also include initiating communication with the third party based on, at least in part, the reply to the notification.

According to another implementation, a computer program product includes a computer readable medium having a plurality of instructions stored on it. When executed by a processor, the instructions may cause the processor to perform operations including receiving a request to initiate a communication with a third party. A plurality of notification options may be provided. A selection of one of the plurality of notification options may be received. A notification may be transmitted to the third party based on, at least in part, the selected one of the plurality of notification options.

According to another implementation, a method may include receiving a request to initiate a call via a channel. A call participant set associated with the channel may be identified. A sequence of communications associated with the call may be transmitted. The sequence of communications may include at least a real-time media data type and a posted data type. The sequence of communications may be transmitted to the call.

One or more of the following features may be included. Identifying the call participant set associated with the channel may include accessing a predefined channel participant set associated with the channel. Identifying the call participant set associated with the channel may include defining a channel participant set based on, at least in part, an implicit association of individuals.

Receiving the sequence of communications may include receiving the sequence of communications as real-time packetized data transmissions. The real-time media data type may include real-time audio data. The real-time audio data may include voice over IP data. The real-time audio data may include a burst audio transmission. The posted media data type may include one or more of video, images, text, web data, location data.

Transmitting the sequence of communications to the call may include transmitting the sequence of communications to each member of the call participant set. Transmitting the sequence of communications to each member of the call participant set may include synchronously transmitting the sequence of communications to at least a portion of the call participant set. Transmitting the sequence of communication to each member of the call participant set may include asynchronously transmitting the sequence of communications to at least a portion of the call participant set.

The method may also include recording the sequence of communications associated with the call. Recording the sequence of communications associated with the call may include defining an association between each of the communications of the sequence of communications and the call. Recording the sequence of communications associated with the call may include defining an association between the call and the channel. Recording the sequence of communications associated with the call may include defining an association between each member of the call participant set and the channel. Recording the sequence of communications associated with the call may include defining an access control associated with the call.

According to another implementation, a computer program product includes a computer readable medium having a plurality of instructions stored on it. When executed by a processor, the instructions may cause the processor to perform operations including receiving a request to initiate a call via a channel. The instructions may also cause the processor to identify a call participant set associated with the channel. The instructions may also cause the processor to receiver a sequence of communications associated with the call. The sequence of communications may include at least a real-time media data type and a posted data type. The instructions may also cause the processor to transmit the sequence of communications to the call.

One or more of the following features may be included. Identifying the call participant set associated with the channel may include accessing a predefined channel participant set associated with the channel. Identifying the call participant set associated with the channel may include defining a channel participant set based on, at least in part, an implicit association of individuals.

Receiving the sequence of communications may include receiving the sequence of communications as real-time packetized data transmissions. The real-time media data type may include real-time audio data. The real-time audio data may include voice over IP data. The real-time audio data may include a burst audio transmission. The posted media data type may include one or more of video, images, text, web data, location data.

Transmitting the sequence of communications to the call may include transmitting the sequence of communications to each member of the call participant set. Transmitting the sequence of communications to each member of the call participant set may include synchronously transmitting the sequence of communications to at least a portion of the call participant set. Transmitting the sequence of communication to each member of the call participant set may include asynchronously transmitting the sequence of communications to at least a portion of the call participant set.

Instructions may also be included for recording the sequence of communications associated with the call. Recording the sequence of communications associated with the call may include defining an association between each of the communications of the sequence of communications and the call. Recording the sequence of communications associated with the call may include defining an association between the call and the channel. Recording the sequence of communications associated with the call may include defining an association between each member of the call participant set and the channel. Recording the sequence of communications associated with the call may include defining an access control associated with the call.

According to another implementation, a computing system includes a processor and a memory coupled with the processor. The processor and memory may be configured to perform operations including receiving a request to initiate a call via a channel. The processor and memory may be configured to identify a call participant set associated with the channel. The processor and memory may also be configured to receive a sequence of communications associated with the call. The sequence of communications may include at least a real-time media data type and a posted data type. The processor and memory may further be configured for transmitting the sequence of communications to the call.

One or more of the following features may be included. Identifying the call participant set associated with the channel may include accessing a predefined channel participant set associated with the channel. Identifying the call participant set associated with the channel may include defining a channel participant set based on, at least in part, an implicit association of individuals.

Receiving the sequence of communications may include receiving the sequence of communications as real-time packetized data transmissions. The real-time media data type may include real-time audio data. The real-time audio data may include voice over IP data. The real-time audio data may include a burst audio transmission. The posted media data type may include one or more of video, images, text, web data, location data.

Transmitting the sequence of communications to the call may include transmitting the sequence of communications to each member of the call participant set. Transmitting the sequence of communications to each member of the call participant set may include synchronously transmitting the sequence of communications to at least a portion of the call participant set. Transmitting the sequence of communication to each member of the call participant set may include asynchronously transmitting the sequence of communications to at least a portion of the call participant set.

The processor and memory may be further configured for recording the sequence of communications associated with the call. Recording the sequence of communications associated with the call may include defining an association between each of the communications of the sequence of communications and the call. Recording the sequence of communications associated with the call may include defining an association between the call and the channel. Recording the sequence of communications associated with the call may include defining an association between each member of the call participant set and the channel. Recording the sequence of communications associated with the call may include defining an access control associated with the call.

The details of one or more implementations are set forth in the accompanying drawings and the description below. Other features will become apparent from the description, the drawings, and the claims.

DETAILED DESCRIPTION OF THE INVENTION

Figure 1:
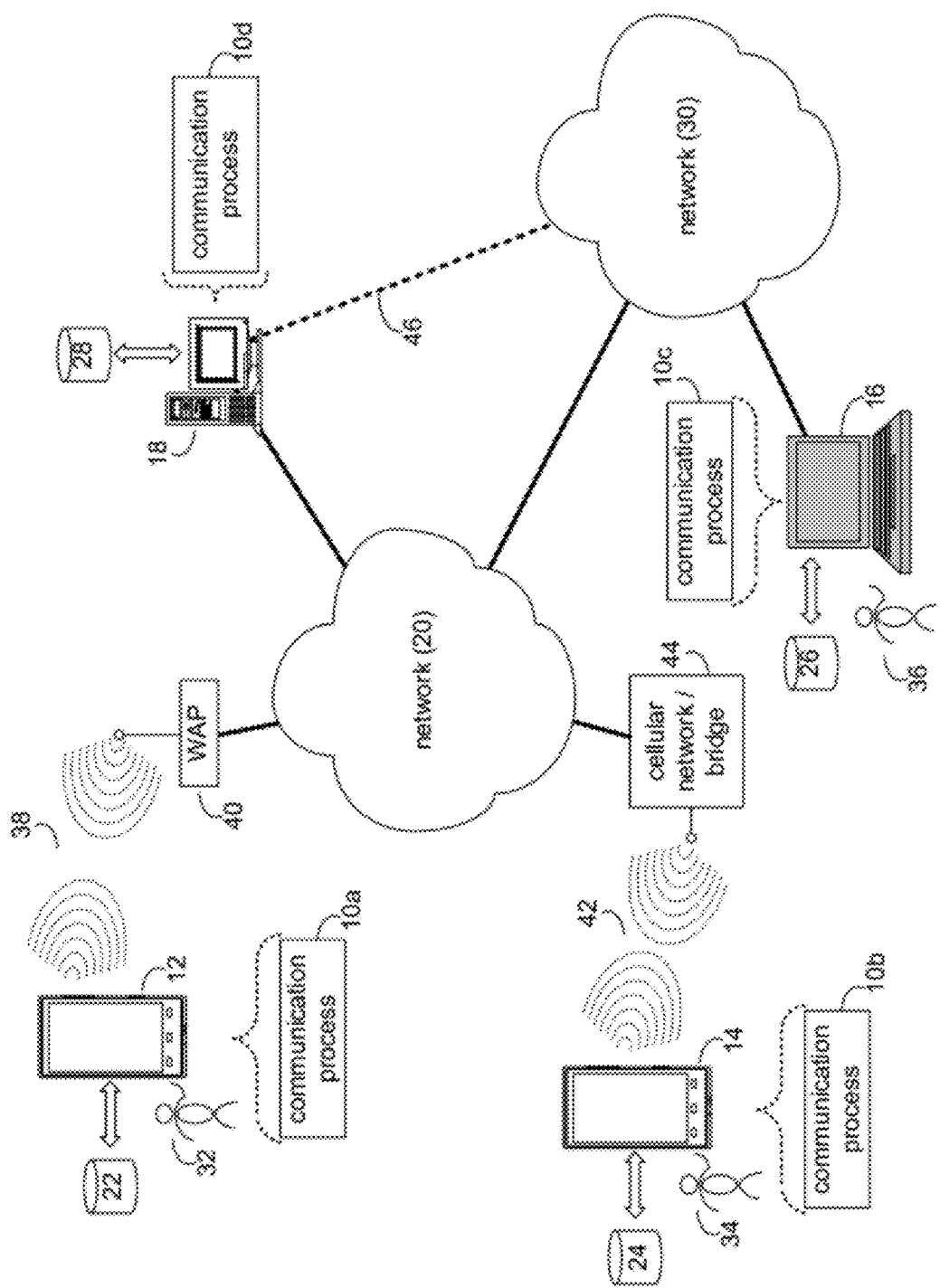
FIG. 1 diagrammatically depicts a communication process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, and/or in scripting languages such as JavaScript programming language or the Groovy programming language. Furthermore, various application programming interfaces (APIs) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown communication process 10a through 10d (which may collectively and/or generally be referred to as communication process 10) that may reside on and may be executed by one or more client electronic devices (e.g., client electronic devices 12, 14, 16, etc.) and/or by server computer 18. The one or more client electronic devices 12, 14, 16 and/or server computer 18 may be connected to network 20 (e.g., the Internet, a local area network, a private government network, or other network). Examples of client electronic devices may include mobile computing devices (e.g., smart phones 12, 14, tablet computing devices, data enabled cellular telephones, network connected personal digital assistants, or the like), personal computing devices (e.g., notebook computer 16, desk top computers, gaming consoles, and the like), network connected television devices and/or set-top boxes, networked camera devices, networked embedded computing devices, as well as various additional/alternative network connectable computing devices. Examples of server computer 18 may include, but are not limited to: a personal computer, a server computer, a series of server computers, a mini computer, a mainframe computer, cloud computing services that may include virtualized instances of server computers, and the like.

As will be described in greater detail below, communication process 10 may generally provide an integrated communication system that may allow concurrent interactions between small and/or large groups of users via multiple data and/or media types. Various different types of information, ideas, and subject matter may be best communicated and shared in different modalities. As such, communication process 10 may allow for rich interactions between users through the concurrent exchange, sharing, and/or consumption of audio messages and conversations, video content, text-based information, pictures, and the like. Communication process 10 may allow multiple different data and media types to be exchanged between users and consumed by the users by providing an integrated user experience.

The instruction sets and subroutines of concept development process 10, which may include one or more software modules, and which may be stored on storage device (e.g., one or more of storage devices 22, 24, 26, 28) coupled to one or more of client electronic devices 12, 14, 16, and/or server computer 18, may be executed by one or more processors (not shown) and one or more memory modules (not shown) incorporated into client electronic devices 12, 14, 16 and/or server computer 18. Storage devices 22, 24, 26, 28 may include but is not limited to: a hard disk drive; a solid state drive, a tape drive; an optical drive; a RAID array; a random access memory (RAM); a read-only memory (ROM), a flash memory device, or the like.

Each client electronic devices 12, 14, 16 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.) Additionally, client electronic devices 12, 14, 16 may allow for various data capture and rendering functionality, such as audio capture, audio streaming, and audio playback, video capture, video streaming, and video playback, text input and text display, and image capture and image display. Various different client electronic devices may further provide additional/alternative functionality, including, but not limited to, sensor functionality including, but not limited to location (e.g., via GPS data acquisition or the like).

Further, while not shown, client electronic devices 12, 14, 16 may execute various applications, including, but not limited to web browser applications (e.g., Safari®, Chrome®, Internet Explorer®; Safari is a trademark of Apple Inc. in the United States, other countries, or both; Chrome is a trademark of Google Inc. in the United States, other countries, or both; Internet Explorer is a trademark of Microsoft Corporation in the United Sates, other countries, or both), text messaging applications, instant messaging application, audio, video and/or image capture and editing application, social networking application (e.g., Facebook application, LinkedIn application, etc.). Various additional/alternative applications may similarly be executed by one or more of client devices 12, 14, 16. Communication process 10a, 10b, 10c may be a stand alone application and/or may be a module and/or component of one or more additional applications executed by client electronic devices 12, 14, 16. Additionally/alternatively, communication process 10a, 10b, 10c may interact with one or more applications executed by client electronic devices 12, 14, 16.

In some embodiments, server computer 18 may be an internet-connected server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) In some embodiments, server computer 18 may execute a web server application, examples of which may include but are not limited to: Microsoft IIS, Novell Webserver™, or Apache® HTTP Server, Apache® Tomcat® application server, that allows for HTTP (i.e., HyperText Transfer Protocol) access to server computer 18 via network 20 (Webserver is a trademark of Novell Corporation in the United States, other countries, or both; and Apache and Tomcat are registered trademarks of Apache Software Foundation in the United States, other countries, or both). In some embodiments, the server computer be implemented as cloud services, such as Amazon Web Services and/or Microsoft Windows Azure. Network 20 may be connected to one or more secondary networks (e.g., network 30), examples of which may include but are not limited to: a local area network; a wide area network; or an intranet, for example.

In some embodiments, server computer 18 may execute various applications in addition to communication process 10d. For example, server computer 18 may execute data storage systems, including but not limited to database systems. Server computer 18 may also execute, for example, a Voice over IP system and/or unified telephony system (e.g., which may be provided by the Asterisk open source platform sponsored by Digium, Inc., FreeSWITCH open source telephony platform or other suitable communication application and/or platform. Various additional and/or alternative applications may be executed by server computer 18.

Consistent with various embodiments, communication process 10 may include a client-side process executed by one or more of client electronic devices 12, 14, 16. Further, in some embodiments, communication process 10 may include a server-side process executed by server computer 18. For example, as a server-side process, one or more users (e.g., users 32, 34, 36) may access the server-side process (e.g., communication process 10d) via a web browser, or other suitable application (e.g., which may include an application that may provide functionality in addition to accessing server-side communication process 10d). Additionally, in some embodiments, communication process 10 may include a hybrid server-client process with some of the functionality of communication process 10 executed by one or more of client electronic devices 12, 14, 16 and some of the functionality of communication process 10 executed by server computer 18. In various hybrid embodiments, one or more of client-side communication processes 10a, 10b, 10c may include stand-alone communication applications and/or may include modules or features of other applications, and/or may otherwise integrate with and/or interact with one or more other applications (e.g., which may provide functionality in addition to functionality provided by one or more of communication applications 10a, 10b, and/or 10c).

Users 32, 34, 36 may access communication process 10 via the client electronic device executing communication process 10 (e.g., smart phone 12 executing communication process 10a, smart phone 14 executing communication process 10b, notebook computer 16 executing communication process 10c). Using communication process 10, one or more of users 32, 34, 36 may interact with one another using a variety of data types in a contemporaneous manner, allowing for a rich and dynamic exchange of ideas and information between the users.

The various client electronic devices may be directly or indirectly coupled to network 20 (or network 30). For example, smart phone 12 is shown wirelessly coupled to network 20 via wireless communication channel 38 established between smart phone 12 and wireless access point (i.e., WAP) 40, which is shown directly coupled to network 14. WAP 40 may be, for example, an IEEE 802.11a, 802.11b, 802.11g, Wi-Fi, and/or Bluetooth device that is capable of establishing wireless communication channel 38 between smart phone 12 and WAP 40. Smart phone 14 is shown wirelessly coupled to network 14 via wireless communication channel 42 established between smart phone 14 and cellular network/bridge 44, which is shown directly coupled to network 14. Notebook computer 16 is shown coupled to network 30 (e.g., which may further be coupled to network 20 and/or server computer 18 via connection 46) via a hardwired connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

One or more example embodiments may be described that may illustrate particular features and/or aspects of the disclosure. For the purpose of description, reference may be made to communication process 10a executed by smart phone 12 and/or in connection with user 32. It will be understood, however, that such reference is intended only for the purpose of explanation, and should not be construed as a limitation on the present disclosure. Other instantiations of the communication process, client electronic devices, and/or users may be equally utilized.

Figure 2:
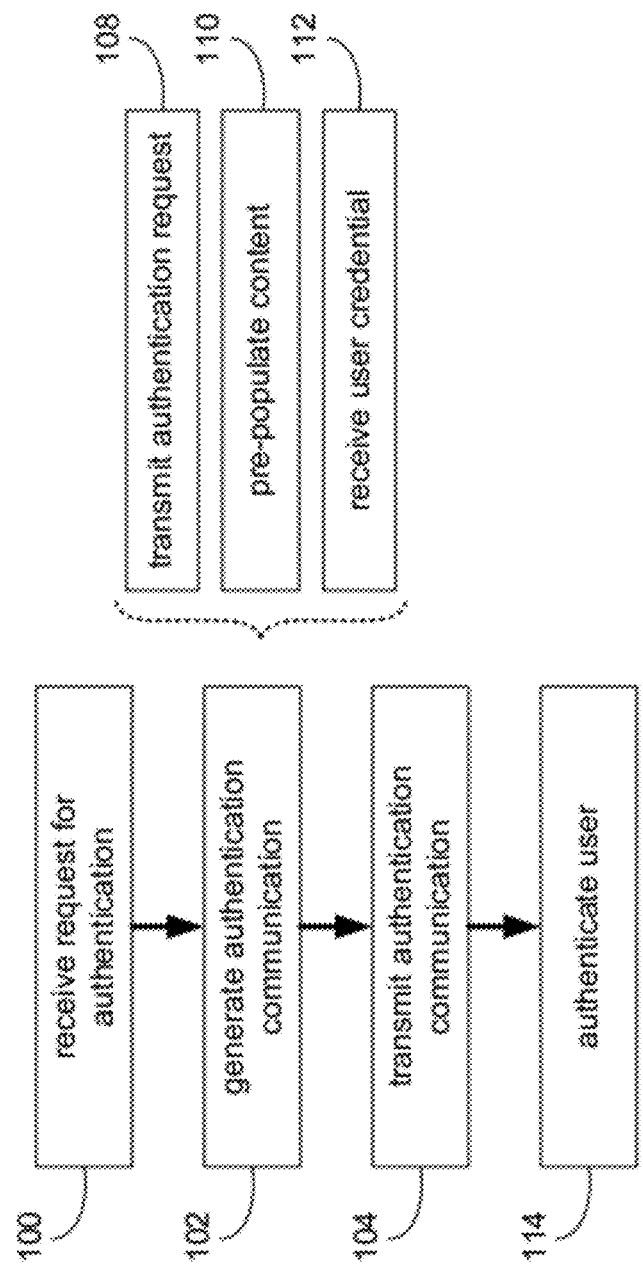
FIG. 2 is a flowchart of a process that may be executed by the communication process of FIG. 1.

Referring also to FIG. 2, according to one aspect, communication process 10 may facilitate user registration or enrollment with an application or system that may utilize authentication and/or verification of a user identity. In some embodiments, communication process 10 may allow a user to register or enroll with the application using an existing third-party application associated with the user for the purpose of authenticating and/or verifying the identity of the user without requiring that the user leave navigate away from an enrollment user interface. For example, in general, communication process 10 may receive 100 a request for authentication of a user. Communication process 10 may generate an authentication communication via a third-party application associated with the user. Communication process 10 may further transmit 104 the authentication communication to an authentication system.

Figure 3:
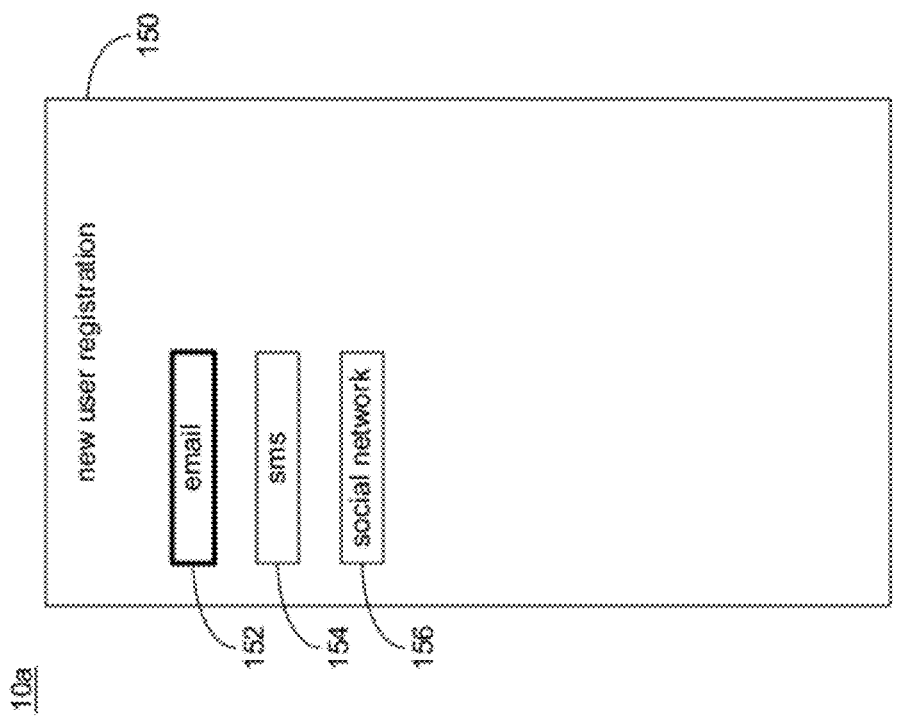
FIG. 3 graphically depicts a user interface that may be generated, at least in part, by the communication process of FIG. 1.

For example, and referring also to FIG. 3, user 32 may wish to enroll or register with third-party communication system (e.g., that may, in some embodiments, be provided at least in part by and/or in connection with communication process 10). Communication process 10, alone and/or in conjunction with one or more additional applications, may provide registration user interface 150. Registration user interface 150 may, for example, allow user 32 to register and/or otherwise enroll through a third-party system provided by communication process 10. It will be appreciated that the registration and authentication functionality provided by communication process 10 may be implemented in conjunction with applications and/or systems with which the user may have already authenticated their identity, e.g., which may thereby provide a facile authentication process.

As discussed above, communication process 10 may receive 100 a request for authentication of the user. The request for authentication may include a request for authentication associated with a third party application associated with the user (i.e., the user may identify how he wishes to be identified for the purpose of authentication). For example, user 32 may wish to register as a new user of the communication system. As shown, registration user interface 150 may allow user 32 to select a mode of authentication that is to be used for the purpose of registering for the application and for the purpose of authenticating the user and/or verifying an identity of the user. For example, user 32 may utilize an existing telephone number, email address, social networking identification, or the like, for the purpose of authenticating his identity for the communication system.

As shown, in an example embodiment, registration user interface 150 may include selection options (e.g., buttons 152, 154, 156) that may allow user 32 to select a third-party application that user 32 wishes to use for authenticating his identity with the system. As shown, buttons 152, 154, 156 may identify various third party applications (namely, email, sms, and social network) that may be utilized for authenticating user 32. While user interface 150 is shown including three options (namely "email," "sms," and "social network"), such options are intended for the purpose of illustration, and not of limitation as other options (e.g., having associated third-party applications) may equally be utilized, including, but not limited to other authentication systems, messaging systems (such as instant messaging systems), and the like. In an embodiment, in response to user 32 selecting a button (e.g., via touch input that may be received by communication process 10 via a touch screen associated with smart phone 12), communication process 10 may receive 100 a request for authentication of the user. The request for authentication of the user may include a request for authentication associated with a third-party application (e.g., "email" in the illustrated example) associated with user 32.

Upon receiving 100 the request for authentication of the user (e.g., based upon, at least in part, selection of a third-party application associated with the user), communication process 10 may generate 102 an authentication communication via the selected third-party application associated with the user. In an embodiment, communication process 10 may interact with (directly and/or indirectly) the selected third-party application associated with the user for the purpose of generating 102 the authentication communication.

Figure 4:
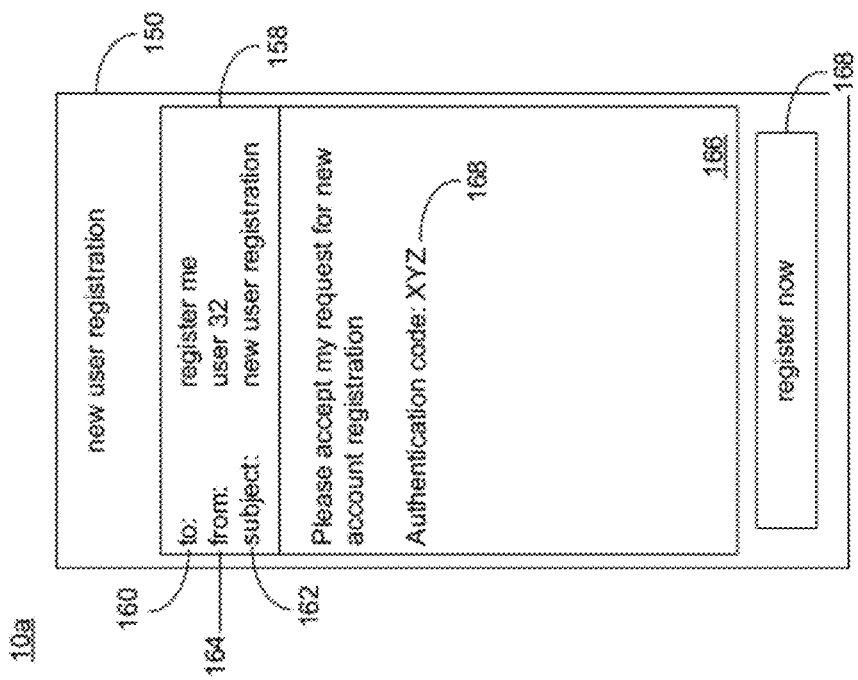
FIG. 4 graphically depicts a user interface that may be generated, at least in part, by the communication process of FIG. 1.
Figure 5:
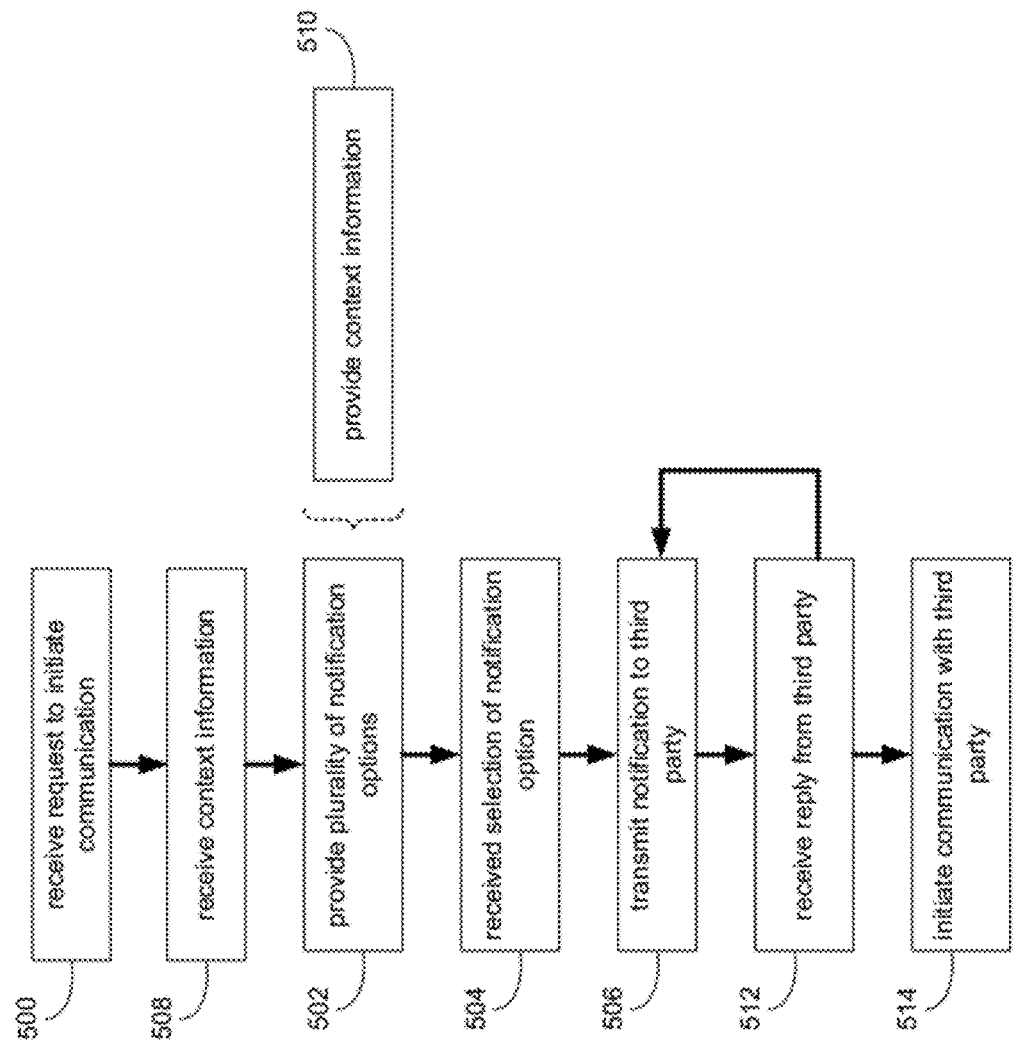
FIG. 5 is a flow chart of a process that may be executed by the communication process of FIG. 1.

Referring also to FIG. 4, communication process 10 may generate 102 the authentication communication via the third-party application associated with the user (e.g., an email application in the foregoing example) using an embedded send form 158 for the communication application. Communication process 10 may generate 102 the authentication communication using the embedded send form, for example, as a pop-up window with the registration user interface 150 by issuing a request to launch the communication application associated with the user.

As shown in FIG. 4, in some embodiments, generating 102 the authentication communication may include pre-populating 110 a communication content including a destination address and an authentication code. For example, communication process 10 may pre-populate 110 one or more fields of the communication within send form 158. In the illustrated example, communication process 10 may pre-populate 110

"to" field 160 and "subject" field 162 of send form 158. In various embodiments, "to" field 160 may be pre-addressed, for example, with an email address or SMS phone number associated with an address associated with an authentication system associated with communication process 10. For example, using the pre-addressed "to" field, the third-party communications service associated with the third party communication application may transmit (e.g., and ultimately deliver) the message to communication process 10.

In various embodiments, "from" field 164 may be populated based upon one or more account settings of the communication application (i.e., email application, in the example embodiment) associated with the user. In some embodiments, the selected third-party application associated with the user may include more than one user account. For example, an email application associated with smart phone 12 may include more than one email account that may be accessed via the email application. According to an example embodiments, the "from" field 164 may be pre-populated (e.g., by an operating system or the email application, etc.) based on a default account, e.g., that may be defined in one or more preferences associated with smart phone 12 and/or the email application executed by smart phone 12. In such an embodiment, communication application may generate 102 an authentication communication via the selected third-party application based on the identified default account (e.g., the "from" field 164 may be pre-populated 110 based on default account information, e.g., from a device operating system, or the like). In some embodiments, communication process 10 may allow user 32 to select a desired account for the purpose of generating 102 the authentication communication. While not shown, in some embodiments, user 32 may, for example, select the pre-populated "from" field 164, which may result in communication process 10 (alone and/or in conjunction with the email application, or other third-party application) rendering various user interfaces (e.g., popup menus or the like) that may allow user 32 to select a desired account for authentication.

Further, communication process 10 may pre-populate 110 body 166 of the communication included within send form 158. In some embodiments, pre-populating 110 body 166 may include generating an authentication code, e.g., which may be used by an authentication system for authenticating user 32. In some embodiments, pre-populating the "subject" field 162 may include generating such authentication code. Consistent with the foregoing example, communication process 10 may generate 102 the authentication communication including the necessary information for authenticating user 32 with the communication system (or other system with which user 32 may register), based upon user 32 selecting the communication application via which authentication is desired. Further, it may not be necessary for user 32 to navigate away from user interface 150 provided by communication process 10. Accordingly, in some embodiments, a registration and/or authentication process for registering for an application and/or system may be simplified and may be more "user friendly."

Communication process 10 may further transmit 104 the authentication communication to an authentication system. For example, in connection with the generated 102 authentication communication (e.g., which may be included within send form 158), communication process 10 may allow the user (e.g., user 32 in the above-described embodiment) to affirm his intent to register, e.g., by selecting register now button 168. In response to user 32 selecting register now button 168, communication process 10 may instruct the mutually-trusted third-party communication system to itself transmit and attempt to deliver the authentication communication. Pre-addressing of the "to" field 160 (i.e., pre-populating "to" field 160) may cause the message to ultimately be delivered, e.g., through a network-connected server 18, into communication process 10*d*. Upon receipt of this message, authentication code 168 may be used to verify and correlate this received authentication message. Accordingly, in response to receipt of the message and correlation of the received authentication code included within the message, communication process 10 (e.g., communication process 10*d* executed by server computer 18) may authenticate 114, the user. As is known in the art, the authentication system (e.g., which may include communication process 10*d*, and/or another authentication system and/or process) may then utilize a variety of standard techniques that may verify that the incoming communication (e.g., generated 102, at least in part, by communication process 10) is authentic and is not a spoofed communication and/or address.

In some embodiments, generating 102 the authentication communication may include receiving 112 a user credential associated with a third-party application. For example, while not shown, in some embodiments a user may wish to use a third-party authentication application for the purpose of registration and/or authentication. For example, the user may wish to use the authentication system associated with a third-party social networking system for the purpose of registration and/or authentication. In such an embodiment, communication process 10 may prompt the user for one of a set of third-party authentication systems that the user wishes to use for registration and/or authentication, which may then require the user to enter login credentials (e.g., username and password) associated with that social networking system. Communication process 10 may call upon the social networking system (e.g., by transmitting 108 an authentication request to the social networking system) which would itself receive the user credentials (e.g., which may be input via an appropriate user interface), and may provide 116 authentication based on the successful authentication with that third-party system.

According to some embodiments, a communication system and method consistent with the present disclosure may provide a platform that may enable rich and multi-faceted interaction between by way of multiparty communications systems, and polysynchronous communications systems that may seamlessly integrate and facilitate real-time and asynchronous modalities. The interaction may be about more than just voice or images, but rather may include an integration of many data types and modalities that may provide a user experience that may be about sharing and observing in a manner that may leverage all the various capacities and functionalities of modern computing devices, such as smart phones and the like. The different data types and modalities may be utilized across different contexts to provide highly meaningful and interactive experiences.

In an aspect of the present disclosure, a communication system may provide a signaling functionality and features that may decrease the transaction costs associated with individuals connecting with one another. As used herein, signaling may generally encompass interactions that may occur as a precursor to the actual substance of a communication. In some embodiments, signaling may include interactions and activities by which a communication may be initiated and/or established between individuals. According to an implementation, communication process 10 may receive 500 a request from a user (i.e., a caller), to initiate a communication with a third party (i.e., one or more callees). Communication process 10 may provide 502 a plurality of notification options. Communication process 10 may receive 504 a selection of one of the plurality of notification options. Communication process 10 may further transmit 506 a notification to the third party based on, at least in part, the selected one of the plurality of notification options.

For example, in an embodiment, communication process 10 may receive 500 a request to initiate a communication. In some embodiments, the request by the caller to initiate a communication with one or more callees may include, at least at one level, an identification of the individual or individuals with whom the caller may wish to communicate, and an indication that the caller may wish to initiate the communication. For example, and referring to FIG. 6, according to some embodiments, a communication process (e.g., communication process 10a associated executed by smart phone 12 associated with user 32), alone and or in conjunction with one or more additional applications, may provide contacts list user interfaced 600. Contacts list user interface 600 may include a listing of one or more individuals who may utilize (e.g., may be registered with) a cooperating communication system. In such an embodiment, communication process 10 may receive 500 the request to initiate a communication in response to the caller (e.g., user 32) selecting an individual (e.g., user 34, who may, therefore, be a callee) from within contacts list user interface 600. In various embodiments, user 32 may simply select (e.g., via a touch screen interface or other suitable selecting device) the individual with whom user 32 (as the caller) wishes to initiate a communication.

According to various additional/alternative embodiments, communication process 10 may interact with one or more additional applications and/or utilize one or more additional/alternative interfaces through which communication process 10 may receive 500 the request to initiate a communication. For example, in an embodiment communication process 10 may interact with a calendaring application executed by a computing device executing communication process 10 (e.g., a calendaring application executed by smart phone 12 which may execute communication application 10a). In an embodiment, the caller (e.g., user 32) may select an individual who may be listed as an invitee of a meeting included within the calendaring application. In response to a suitable user input (e.g., a touch and swipe input, or long touch input, or other suitable user input), communication process 10 may, alone and/or in conjunction with the calendaring application, render a menu option to initiate a communication with the selected individual. Upon user 32 selecting the menu option to initiate a communication with the selected individual, communication process 10 may receive 500 a request to initiate a communication with the selected individual. Communication process 10 may receive 500 a request to initiate a communication with a selected individual in a similar manner in response to user interactions with various additional and/or alternative applications, such as social networking applications, email applications, mapping application (e.g., which may include an indication of a location of various individuals), or other suitable applications.

In some embodiments, in response to receiving 500 a request to initiate a communication with an individual, communication process 10 may receive 508 context information associated with the individual with whom the user has indicated an intent to communicate. In some embodiments, communication process 10 may receive 508 the context information in response to, e.g., contacts list user interface 600 (or another interface from which a callee may be selected) being invoked. That is, in an embodiment, communication process 10 may receive context information associated with one or more callees (and/or potential callees) based on an interface from which a callee may be selected being invoked. According to various embodiments, the context information may provide, to various degrees, status awareness information and/or cues regarding the callee (i.e., the individual with whom a desire to communication has been received 500). For example, the context information may include information that may provide indicators and/or cues as to the individual's availability status and likely capacity and/or willingness to participate in a communication, and/or a format of communication in which the individual may be capable of participating. These contextual cues may be set explicitly by the callee (e.g., in a communication application associated executed by a client device associated with the callee), and/or may be automatically derived by the communication application from the client device's operating system, the client device's hardware sensors, and/or application programs, services, etc., associated with the client device associated with the callee. The contextual cues may include a callee's general or specific, current or recent location, direction, and velocity, or that of their communication device.

For example, context information may include one or more of a location of the individual (i.e., the callee) and a trajectory information associated with the individual, e.g., as may be provided by a GPS receiver, compass and accelerometer associated with a device associated with the individual (e.g., smart phone 14 associated with user 34), proximity to a cellular transceiver or WiFi access point, etc. Location information may include absolute and/or relative location information (e.g., the individual is at their home, the individual is close to you, etc.). Similarly the trajectory information may indicate, for example, movement of the individual and information such as specific or general speed and direction of movement. Location and/or trajectory context information may indicate, for example, that the individual is currently traveling at driving speeds in a generally northeast direction, etc. The context of the individual currently traveling at driving speeds may be leveraged, for example, relative to a data type that may be used for communication with the individual. For example, text based communication may not be a desirable communication format for an individual who may be driving, etc.

In some embodiments, the context information may include sensor information associated with a client device associated with the third party callee (e.g., smart phone 14 associated with user 34). For example, the sensor information may indicate that the device has been in darkness, plugged-in, and in a motionless state (e.g., based on accelerometers or other sensors associated with the device) for the last seven hours. In combination with additional information, such as time of day information, etc., the activity information may provide context information suggesting that the individual may not be using the communication device, may be asleep, etc.

In some embodiments, context information may be received 508 based on information associated with other applications of the individual. For example, a telephone application associated with the individual (e.g., telephone functionality associated with smart phone 14 utilized by user 34) may provide context information such as the individual currently engaged in using the device's microphone and speaker in a PSTN call. A meeting scheduled in a calendaring application associated with the individual may provide context information such as the individual currently be engaged in a meeting (e.g., and may also provide context information regarding the meeting, such as the meeting being a teleconference and/or webconference, etc.). Various additional and/or alternative applications associate with the individual may also provide context information associated with the individual.

In various embodiments, the context information may be processed and/or understood in an integrated manner. For example, rather than existing as individual and separate information, the various context information may be interpreted together to provide richer context associated with the individual. For example, context information indicating that the individual is traveling at driving speeds, is engaged in a phone conversation, and is currently scheduled to be in a meeting may be interpreted as the individual being engaged in a teleconference while traveling in a vehicle. Such context information may allow the user wishing to initiate a communication with the individual to evaluate if the individual should be interrupted with a communication (e.g., the user may evaluate the urgency of the communication) and/or how the individual should be interrupted with the communication.

According to various embodiments, the context information may be received 508 in a format and/or way that may be sensitive to the privacy of the individual with whom the context information is associated. For example, the context information may be received 508 having a level of granularity or specificity that may be privacy sensitive. For example, location and/or trajectory information may indicate that the individual is traveling at driving speeds, rather than identifying the exact speed and location of the individual. Various other types of context information may be received 508 in a privacy sensitive format.

Accordingly to various embodiments, the privacy sensitivity of the context information may vary, for example, based on system-wide and/or individual user level settings. For example, a user may establish varying levels of privacy sensitivity associated with various other users. For example, an individual may desire a high degree of privacy in their context information that may be received by casual acquaintances. However, the same individual may desire a lower degree of privacy in their context information that may be received by intimately close friends and family. Accordingly, in some embodiments, the individual may set privacy settings associated with context information and with users that may receive the context information. In some embodiments, a default high level of privacy sensitivity may be associated with context information. The default privacy sensitivity may be altered by the individual for various individual and/or groups of users. Various additional and/or alternative mechanisms for managing privacy sensitivity associated with context information may similarly be implemented.

In an embodiment, communication process 10 may receive 508 the context information directly from a device associated with the individual (e.g. smart phone 14 associated with user 34, etc.). In some embodiments, communication process 10 may receive 508 the context information regarding the individual in response to a request for context information transmitted by communication process 10 to the device associated with the individual. In some embodiments, a device associated with an individual may intermittently transmit context information to a server (e.g., server 18), which may maintain the context information. For example, the device associated with the individual may intermittently (e.g., a predefined intervals) transmit context information to server computer 18. In some embodiments, the device associated with the individual may, for example, transmit context information to server computer 18 in response to a change in the context associated with the individual (e.g., a change in motion state, the indication of a present meeting in a calendaring application associated with the individual, etc.). Consistent with such an embodiment, communication process 10 may receive 508 the context information from server 18. In some embodiments, e.g., in which energy conservation may be desirable, devices may not transmit context information to communication process 10 until communication process 10 indicates (e.g., in real-time and/or near real-time) that such information is actually required. For example, communication process 10 may received 508 the callee context in response to communication process 10 receiving 500 a request to initiate a communications with that specific callee. Various additional/alternative implementations may similarly be implemented.

Communication process 10 may provide 502 a plurality of callee notification options. In some embodiments, the plurality of notification options may, for example, give the caller the option of silently or quietly alerting the callee (e.g., by selecting "alert" button 602 from within contacts list user interface 600), or alternatively giving the caller the option to loudly ring the callee's phone or play a specific ringtone (e.g., by selecting "ring" button 604 from within contacts list user interface 600). In some embodiments, providing 502 the plurality of communication options may include providing 510 context information associated with the callee (i.e., the third party, or individual, with whom the user wishes to communicate). Communication process 10 may provide 510 the context information associated with the individual according to various suitable manners. For example, in some embodiments communication process 10 may provide 510 context information associated with one or more callees and/or potential callees (herein collectively referred to as "callees") in the form of one or more icons (e.g., driving icon 606 and/or walking icon 608) associated with respective callees in contacts list user interface 600. In other examples, communication process 10 may simply display the context information (e.g., "user 34 is traveling at driving speeds") on a display associated with smart phone 12 and/or announcing the information, e.g., via a text to speech engine, etc. Further, various types of context information may be otherwise provided 510. For example, location context information may be provided 510 via a map display interface. For example, in the example embodiment in which user 34 (e.g., the individual with whom user 32 wishes to initiate a communication) is traveling at driving speeds, communication process 10 (alone and/or in conjunction with another application, such as a mapping application) may render a map showing a current and/or recent location of user 34 and may further indicate that user 34 is driving. Various additional and/or alternative mechanisms for providing 510 the context information may similarly be utilized. As discussed above, in some embodiments, communication process 10 may provide the context information prior to providing the plurality of notification options.

Figure 6:
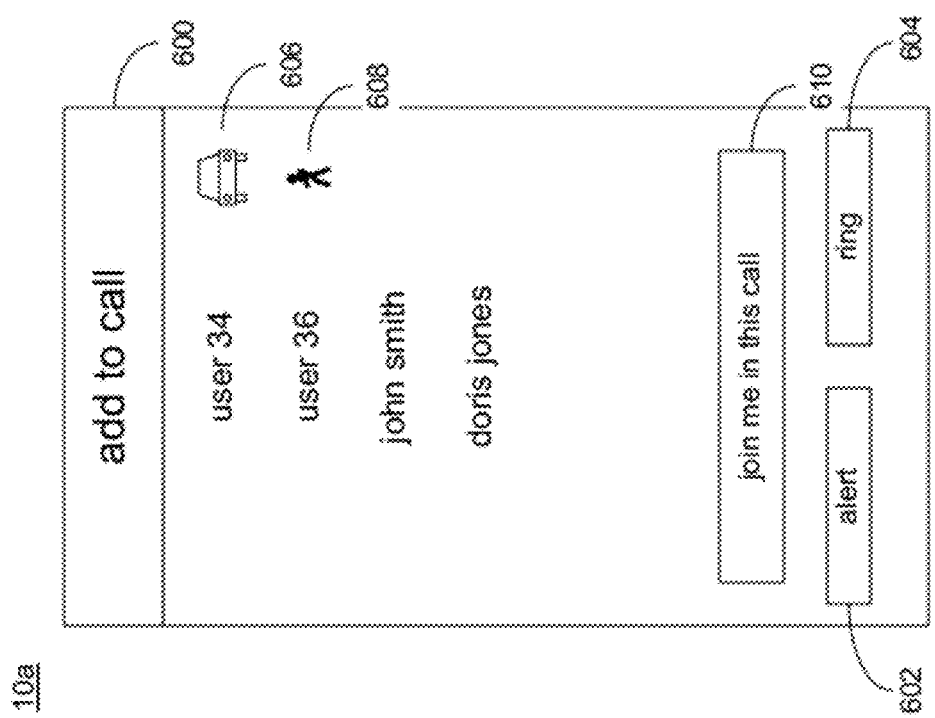
FIG. 6 graphically depicts a user interface that may be generated, at least in part, by the communication process of FIG. 1.
Figure 7:
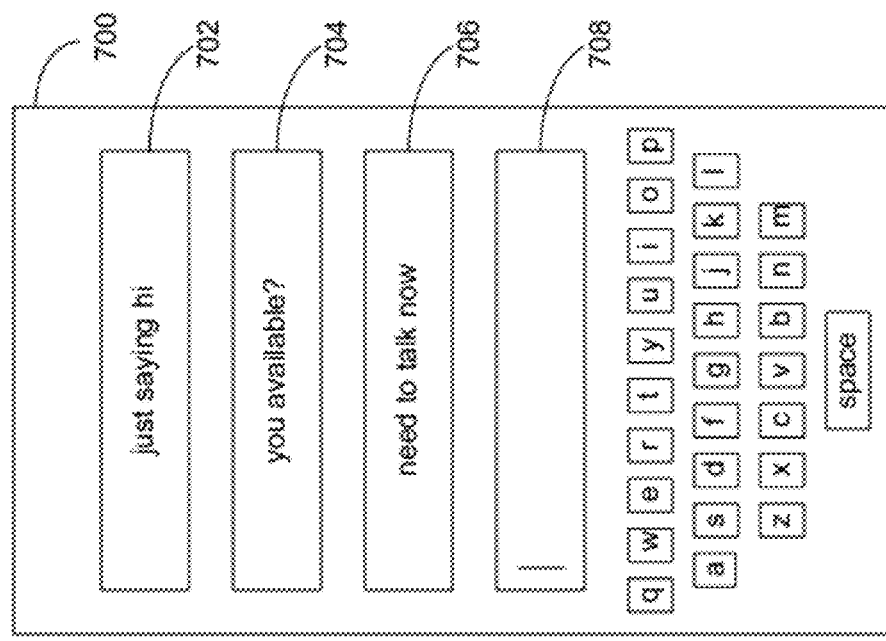
FIG. 7 graphically depicts a user interface that may be generated, at least in part, by the communication process of FIG. 1.

According to an embodiment, the plurality of notification options may include one or more predefined or customized dialog options enabling a lightweight pre-call dialog to be carried out between the caller and callee. For example, the dialog options may include basic exchanges, e.g., that may be used to determine if the individual is available to engage with the caller (e.g., a status request) and/or to determine if the individual has a preferred communication modality or format, e.g., based on a context or situation of the individual. For example, communication process 10 may provide 502 the plurality of notification options including the one or more dialog options as caller-selectable items. For example, as shown in FIG. 6, communication process 10 may provide "join me in this call" button 610. In response to the caller selecting button 610, communication process 10a (alone and/or in conjunction with another application) may generate dialog user interface 700, shown in FIG. 7. Dialog user interface 700 may include one or more predefined dialog options that may be, for example selectable options (e.g., "just saying hi" option 702, "you available?" option 704, and "need to talk now" option 706) within dialog user interface 700. While dialog menu is shown including three dialog options, this is intended only of illustrative purposes, and the number and nature of the dialog options may vary depending upon design criteria and user need. Additionally, dialog user interface may include input field 708, e.g., which may allow user 32 to input a free form dialog. Further, in some embodiments, the dialog options included within dialog menu 602 may be customized, e.g., by the user, by an application developer, a system administrator, or other individual. Further, while FIG. 7 is shown including only a single dialog menu, more than one dialog menu may be included. In some embodiments, various dialog menus may be included having dialog options relating to various signaling aspects (e.g., status and/or availability of the individual, preferred communication modality, importance, etc.)

Communication process 10 may receive 504 a selection of one of the plurality of communication options. For example, the caller (e.g., user 32) may select one or more of the notification options (e.g., one or more of the dialog options included within dialog user interface 700), e.g., using a touch selection gesture, or other suitable selection mechanism. Further, communication process 10 may transmit 506 a notification to the third party (i.e., the callee or individual with whom the user wishes to communicate) based on, at least in part the selected one of the plurality of notification options.

Figure 8:
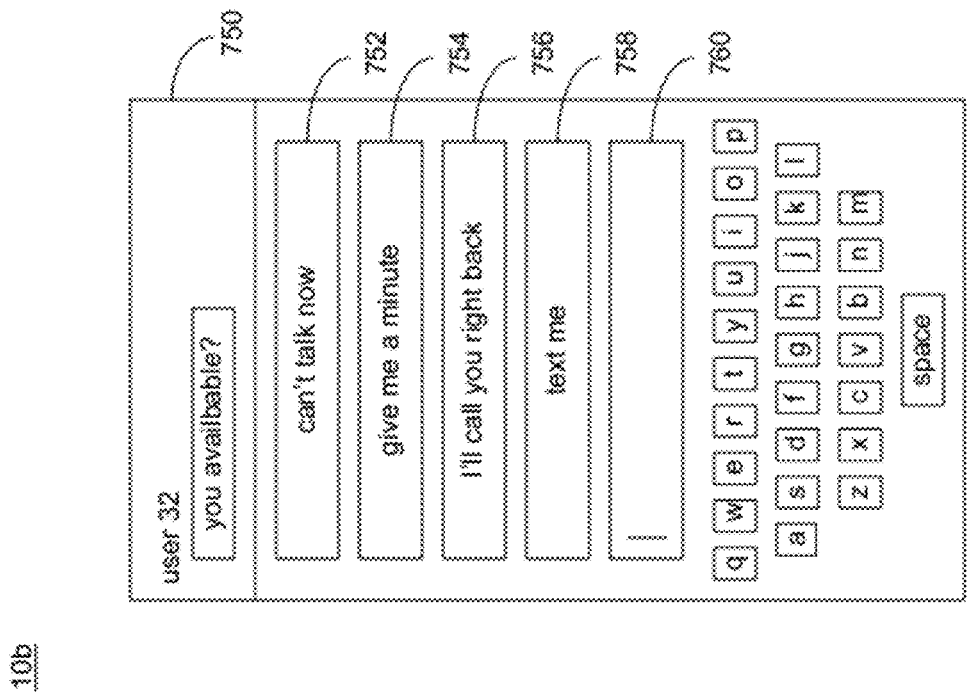
FIG. 8 graphically depicts a user interface that may be generated, at least in at least in part, by the communication process of FIG. 1.

Communication process 10 may further receive 512 a reply to the notification from the third party. For example, in response to user 32 selecting a dialog option (e.g., "you available?" 704) from within dialog user interface 700, communication process 10 (e.g., communication process 10a and/or communication process 10d) may transmit 506 the notification to the callee (e.g., user 34). Referring to FIG. 8, the notification may be received by a device associated with the callee (e.g., smart phone 14 associated with user 34). The dialog option may be displayed (e.g., in user interface 750) on the device associated with the individual (e.g., smart phone 14), for example, by a corresponding communication process (e.g., communication process 10b executed by smart phone 14) and/or another suitable application. In an embodiment, user interface 750 may include one or more response dialog options, which may include one or more selectable response options (e.g., "can't talk now" 752, "give me a minute" 754, "I'll call you right back 756", and "text me" 758). User 34 may select an appropriate response from within response user interface 750, e.g., by touching the desired response, etc. While response user interface 750 has been shown including four options, the number and nature of the options included within response user interface 750 is intended only for the purpose of illustration. The number and nature of responses included within the response menu may vary according to design criteria and/or user need, and may additionally/alternatively be customizable (e.g., by the user, by a system administrator, by an application developer, or by another individual). Further, in some embodiments, the individual may be enabled to enter a free form response (e.g., via input field 760), and/or otherwise responds to the dialog option received from the user.

Figure 9:
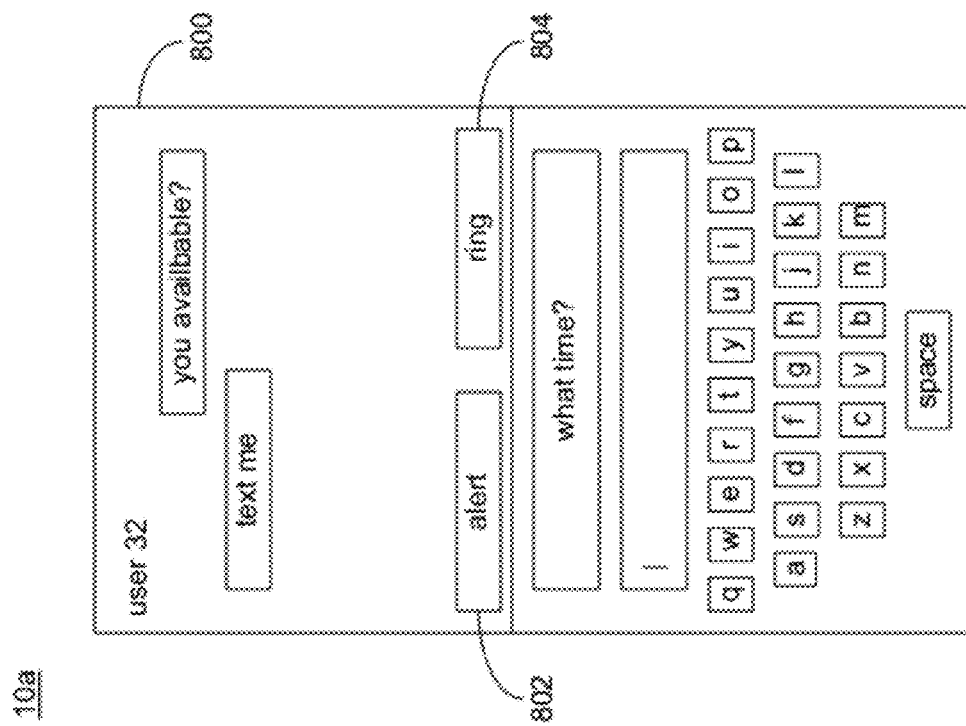
FIG. 9 graphically depicts a user interface that may be generated, at least in part, by the communication process of FIG. 1.

In response to the callee (e.g., user 34) selecting and/or otherwise entering a reply to the dialog option transmitted 506 by communication process 10 as part of the notification, communication process 10 may receive 512 the reply from the individual. For example, as shown in FIG. 9, user 34 may have selected the reply option "text me" from within reply user interface 750. Accordingly, user interface 800 (e.g., which may be rendered on smart phone 12, at least in part by communication process 10a) may display the received 512 reply from the individual.

Communication process 10 may initiate 514 the communication with the individual. For example, user 32 may select the reply from the individual (e.g., user 34 in the present example), and/or may select an initiation option (e.g., alert button 802 and/or ring button 804). In response to user 32 selecting the reply and/or an initiation option within user interface 800 (e.g., via a touch selection input, etc.), communication process 10 may initiate 514 the communication. In the illustrated embodiment in which the reply indicated that the individual desired a text-based communication, communication process 10 may initiate 514 the communication with user 34 with the user interface defaults configured to favor text-based communication, at least as an initial communication modality. Of course, other embodiments may include communications of different modalities, e.g., based on, at least in part, a response to the third party, user preference, or the like.

While the foregoing example has included only a single dialog exchange from the user to the individual with whom the user wishes to communicate, and a single reply back from the individual, the example exchange is only intended for the purpose of illustration, and not of limitation. In various embodiments, multiple back and forth dialog exchanges may occur prior to initiation of the communication. Further, and as generally presented, one or more subsequent sets of dialog and/or responses may be based, at least in part, by a previous dialog and/or response. For example, response dialogs may be based on, at least in part, the received dialogs, such that the response dialog options may be appropriate for responding to the received dialog.

As generally discussed above, according to some aspects, the communication process herein may provide a platform or system for enabling communications between people. In general, the communication process may, in some embodiments, provide a single application that may allow for integrated and contemporaneous exchanges of a wide variety of data types and/or media types in a single call. As used herein, a call may generally refer to sequence of interactions that may be linked together by a generally common time-wise attribute, e.g., with the interactions being temporally ordered and related that the interactions may constitute a single conversation or related group of interactions. Further, the sequence of interactions that make up a call may be generally related in terms of the participants in the call. For example, while a portion of the participants may change during the course of the call (e.g., by virtue of participants joining and/or leaving the call) the call may include a participant attribute. That is, the call may be identified, at least in part, based on who is participating in the call. Accordingly, the participants may be an attribute of the call. In some embodiments, the communication process herein may provide an application and/or system that may provide a real-time media channel between a set of call participants that may allow simultaneous use of, and seamless transitions between, multiple different data types and/or media types during course of a single call.

Referring also to FIG. 9, in an embodiment, communication process 10 may receive 900 a request to initiate a call via a channel. Communication process 10 may also identify 902 a call participant set associated with the channel. Communication process 10 may receive 904 a sequence of communications associated with the call. The sequence of communications may include real-time media data types (e.g., synchronous data types) and asynchronously posted data types. Further, communication process 10 may transmit 906 the sequence of communications into the call.

Communication process 10 may receive 900 a request to initiate a call via a channel, and may identify 902 a call participant set associated with the channel. Consistent with the present disclosure, in general a call may include set of interactions between members of a communication system facilitated by communication process 10. The set of interactions that give rise to the call may include the call being initiated in the context of a channel. A channel may include a set of one or more calls having a common default participant set who may be automatically offered participation in every call initiated within the channel. Accordingly, the participant set of members participating in the interactions may be an attribute of the call. Communication process 10 may identify 902 default call participant set as including a participant set associated with a channel. That is, by default, the call participant set may include the channel participant set. In some embodiments, and as discussed in greater detail below, the channel participant set may be modified for the purpose of a given call, either by adding or removing individuals from the call. The call participant set may include the individuals that may actually participant in the call.

In an example, embodiment, communication process may receive 900 the request to initiate a call in response to an input from a user (e.g., user 32 operating smart phone 12). The input from user 32 may include, for example, a selection of a channel from within a contacts list associated with communication process 10 (e.g., a contacts list that communication process 10a executed on smart phone 12 may interact with, either locally or via a network, such as network 20). In some embodiments, the channel may be implicitly selected by virtue of which channel within which the call is being initiated, and by extension the list of members of or subscribers to that channel. For example, the communication process 10 may allow a channel's membership to be configured manually by users, or may be configured to automatically synchronize with sets of individuals that may be managed externally such as a Facebook group, participants in a common meeting (e.g., which may be managed via a calendaring application or the like), individuals with access privileges to an online workspace or folder, or the like.

Identifying 902 the call participant set associated with the channel may include not only identifying individuals who may be invited to the call, but further, identifying 902 the call participant set associated with an existing channel. As generally described above, in an embodiment identifying 902 the call participant set associated with the channel may include accessing 908 a predefined channel participant set associated with the channel. A predefined channel participant set associated with the channel may include, for example, a list of individuals that may be associated with a past call or a pre-existing channel (e.g., a channel that may have been utilized for one or more calls between the defined group of individuals in the past). Accordingly, in such an embodiment, communication process 10 may identify 902 the call participant set by accessing 908 a participant set associated with pre-existing channels and previous calls. That is, the channel participant set may, at least in part, form the basis of the call participant set (e.g., subject to any modification, such as additions and/or deletions of individuals from the channel participant set for the purpose of the call.

In another embodiment, accessing 908 a predefined channel participant set associated with the channel may include accessing a contacts list accessible by and/or integrated with communication process 10. For example, in an embodiment, a user (e.g., user 32) may define a contacts list associated with communication process 10. The contacts list associated with the communication process may include an indication of one or more channels associated with user 32, in which each of the one or more channels may include one, or more than one, participants in the channel. For example, each individual contact in the contacts list may give rise to a pair-wise channel (e.g., a channel participant set including user 32 and the individual listed in the contact). Similarly, each contact group listed in the contacts list, which may include more than one individual, may give rise to a group-wise channel (e.g., a channel participant set including user 32 and that set of individuals). In response to receiving 900 the request to initiate a call via the channel, communication process 10 may further identify 902 a call participant set (e.g., the intended participants for the call) associated with the channel, which may include accessing 908 the predefined channel participant set associated with the channel, e.g., that is defined in a contacts list. Channels including a predefined participant set may include explicit channels.

In an embodiment, identifying 902 the call participant set associated with the channel may include defining 910 the channel based on, at least in part, an implicit association of individuals. For example, and as also generally discussed above, a channel may be associated with an implicit group of individuals which may include for example, a group of individuals whose association with one another may be implied by a common interaction or point of intersection. For example, the group of individuals may be members of a common social networking group (e.g., a Facebook group, or other similar group). In another example, the group of individuals may be indicated as being attendees and/or invitees to a meeting or activity that may be scheduled using a calendaring system or application. Similar implicit associations of individuals may be based on, for example, individuals having access privileges to a shared online space or folder. Accordingly, communication process 10 may identify 902 a default participant set for a call including defining the channel based on an implicit association of the individuals. Consistent with such an embodiment, communication process 10 may receive 900 the request to initiate the call via the channel based on a user input associated with the point of intersection of the implicitly associated individuals (e.g., by selecting a social networking group, a calendar event, etc.). In a similar manner as discussed above, and as will be described in greater detail below, the call participant set may be based on a modified channel participant set, e.g., by way of the addition of individuals to the channel participant set or the removal of individuals from the channel participant set.

According to various embodiments, call participation may be extended and/or restricted. For example, communication process 10 may allow a channel having a defined (either implicitly or explicitly) participant set to be extended to include one or more additional participants for the purpose of the call. The extension of the call participant set may be temporary (e.g., for the purpose of a single call and/or a portion of a single call). In some embodiments, the extension of the call participant set may be permanent (e.g., may be for the purpose of all calls associated with the channel, and may thereby explicitly modify the underlying channel participant set). In some embodiments, a permanent extension of a channel participant set may give rise to a new channel, which may include the extended participant set. In a generally corresponding manner, communication process 10 may allow a channel having a defined (either implicitly or explicitly) participant set to be restricted by removing one, or more than one, participant from the participant set for the purpose of a call, thereby giving rise to a call participant set that is a subset of the channel participant set. The restriction of a member from the participant set associated with a call may be temporary (e.g., for the purpose of a single call) and/or may be permanent, thereby modifying the underlying channel participant set. In some embodiments, the permanent restriction of a participant set associated with a channel may give rise to the creation of a new channel (e.g., as opposed to simply modifying the pre-existing channel), including the restricted participant set, while maintaining the original channel having the original participant set.

According to various embodiments, suitable user interfaces may be used in connection with the request to initiate the call. For example, in response to a long touch or multi-tap user selection of a contact and/or contact group within a contacts list, or a point of intersection of implicitly associated individuals, communication process 10 may (alone and/or in conjunction with one or more additional applications) render a user interface, such as a menu or the like. The user interface rendered by communication process 10 may provide options for the user (e.g., user 32 in the foregoing example) to request that a call be initiated.

Initiating the call may include, for example, signaling the members of the call participant set to thereby alert the members of the intent of the member to conduct a call via the channel. Signaling may include conventional notification arrangements, including transmitting a notification to one or more devices associated with the members of the call participant set. Additionally/alternatively, advanced signaling as generally described herein may also be implemented. An example of such signaling may utilize pre-call dialogs, e.g., which may ascertain availability and preferred call modality. Other signaling associated with the initiation of a call may similarly be utilized.

Communication process 10 may receive 904 a sequence of communications associated with the call. The sequence of communications may include at least a real-time media data type and an asynchronous posted data type. For example, and as generally discussed above, according to an aspect, communication process 10 may allow communications including multiple different data types and/or including multiple different media types. In an embodiment, receiving 904 the sequence of communications may include receiving the sequence of communications as real-time packetized data transmissions.

According to various embodiments, real-time media data may include data-transmitted and consumed in real-time, as well as streaming media data-types, e.g., including real-time streaming data that may, or may not, be consumed in real time. As used herein, the term real-time may generally media data in which transmitted data may be received and by one or more call participants generally contemporaneously with the transmission of the data. In an embodiment, the real-time media data type may include real-time audio data, such as voice data, and/or may include real-time data such as video data. In one example, the real-time audio data may include voice over IP data, and/or the real-time video data may include video over IP data, although other forms of real-time audio data may be similarly utilized. Consistent with such an aspect, at least a portion of the sequence of communications included within the call may include voice communications. The voice communications may include real-time voice communications, e.g., which may be similar to voice communications in standard telephone or Voice over IP call. In an embodiment, switching and routing of voice communications associated with the call may facilitated by a PBX, Voice over IP, or unified telephony system, e.g., which may interact with communication application 10 (e.g., communication application 10*d* executed by server computer 18). In an embodiment, the PBX, Voice over IP, or unified telephony system may be interconnected with the public switched telephone network.

Figure 10:
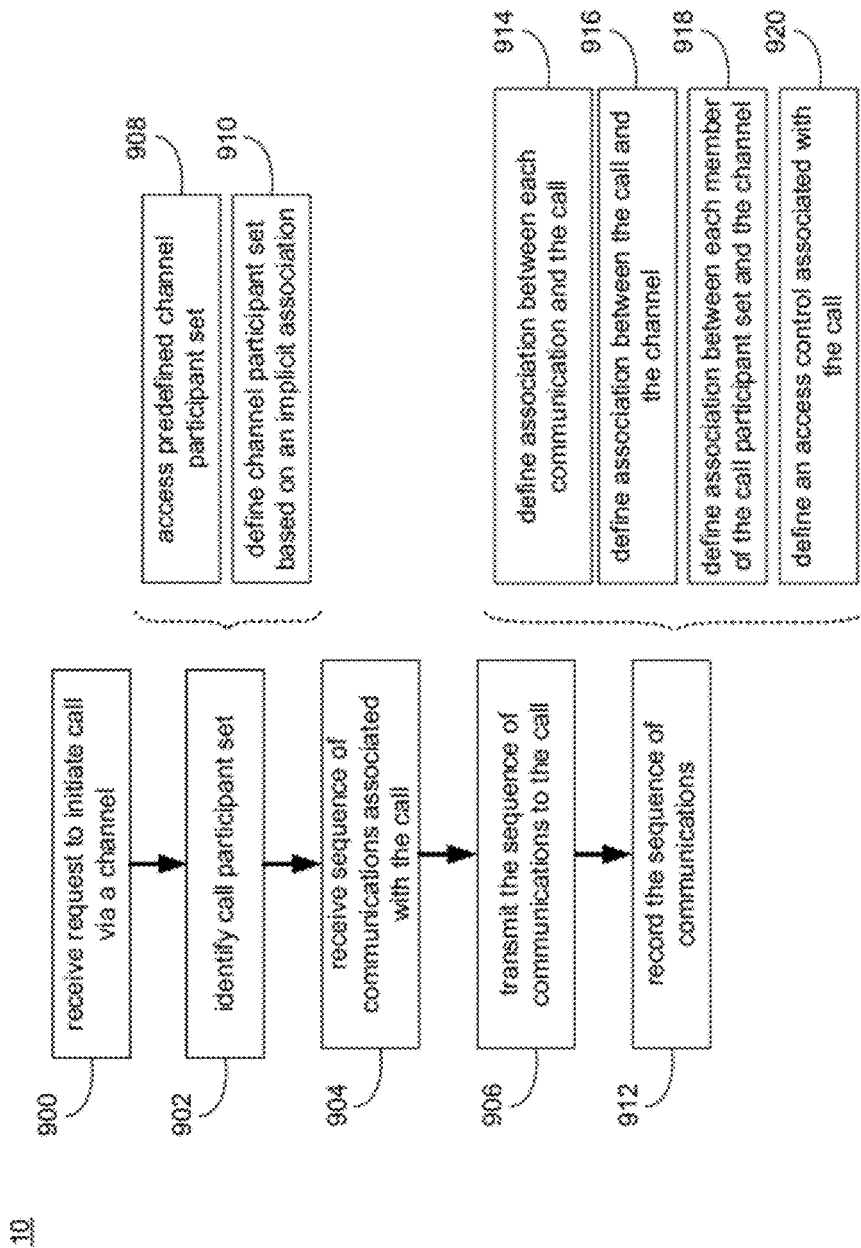
FIG. 10 is a flow chart of a process that may be executed by the communication process of FIG. 1.
Figure 11:
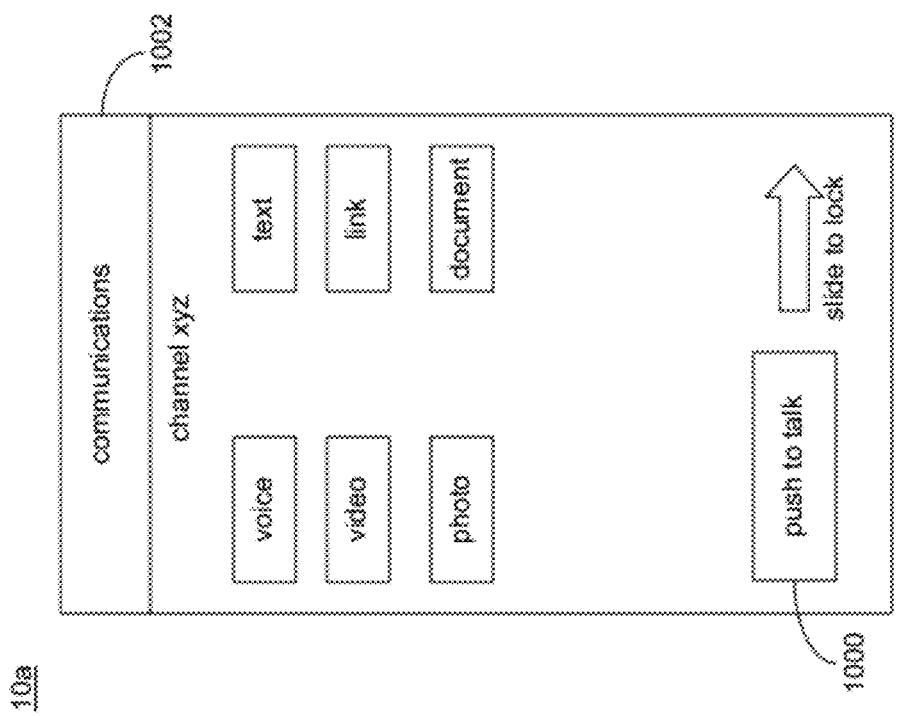
FIG. 11 graphically depicts a user interface that may be generated, at least in part, by the communication process of FIG. 1.

In an embodiment, the real-time audio data may include continuously streaming voice data. In some embodiments, continuously streaming voice data may be implemented in a symmetrical manner, e.g., in which all members included in the call participant set may generate and consume continuously streaming voice data to and/or other members included in the call participant set. In some embodiments, the real-time audio data may include burst audio transmissions, such as burst voice transmissions. For example, and referring also to FIG. 10, communication process 10 may provide talk button 1000, e.g., which may include a virtual button in user interface 1002 provided via a touch screen interface. In response to a user activating talk button 1000, communication process 10 may receive 904 voice data (e.g., any audio data that may be received via a microphone associated with the computing device). Upon the release of talk button 1000, communication process 10 may stop receiving 904 the voice data. In an embodiment, communication process 10 may allow a user to transition between providing burst voice data and providing continuous voice data. For example, and as described, in response to a user pressing talk button 1000, communication process 10 may receive 904 burst voice data for as long as talk button 1000 is activated. In an embodiment, communication process 10 may allow a user to transition to providing continuous voice data. For example, a user may activate talk button 1000 by pressing the virtual button. The user may then invoke a lock gesture (e.g., laterally sliding talk button 1000, or other suitable gesture). In response to the user invoking the lock gesture, communication process 10 may receive 904 continuous voice data.

In addition to synchronous and real-time, near real-time, and/or streaming audio data (such as voice data and/or video data), communication process 10 may receive 904 various types of synchronously streamed and asynchronously posted media data types. Media data types received by communication process 10 may be transmitted 906 synchronously and/or asynchronously. Further, a media data type may be received 904 and transmitted 906 as a defined piece of content, e.g., which may be consumed once the media data has been posted, or may be consumed and processed synchronously in real-time while the media is being transferred. In an embodiment, the posted media data type may include one or more of video data (e.g., video clips), images, text, web data, location data or the like.

While example data types and media types have been described above, it should be appreciated that such examples are intended only for the purpose of illustration, and not of limitation. Various additional and/or alternative data types and media types may also be utilized. Examples of data that may be included as part of a communication associated with a call may include data derived from sensors of functionality provided by the computing device, such as location, traveled routes, velocity, direction, and the like which may be provided form, e.g., navigation or mapping applications and GPS or other functionality provided by the computing device. Microphone and camera functionality associated with the computing device may be used to generate real-time audio (e.g., voice) and or video data, as well as audio clips, video clips, photos, and the like. Input devices, such as touch screen interfaces, may be utilized to generate stylus or finger sketches. Web browser applications may be utilized for the generation and/or capture of web content, web links, etc. Text data, documents, and the like may be generated via the computing device and/or accessed and/or implemented in a communication via input and/or storage functionality associated with the computing device. Accordingly, in various embodiments, the communicated synchronous and asynchronous data types may include one or more of video, still or animated images, text, web links, location and route data, gestures, sketches, files and folders and documents, voice and music and audio, software code and scripts, QR and NFC and bar codes, quality of service data such including signal strength and latency and performance, sensor and other such data obtained from the device, from its operating system, from add-ons or applications or internet services, and from device peripherals that may be connected through wired or wireless means. While the foregoing discussion has provided many examples of data that may be received 904 and transmitted 906 as communication within a call, the list is not intended to be exhaustive, as other data types and/or media types may also be utilized.

Communication process 10 may transmit 906 the sequence of communications to the call. For example, communication process 10 transmit 906 the received 904 communications to all of the members of the call participant set. In some embodiments, one or more members of the call participant set may not be engaged in the call (e.g., may not have joined the call). In an embodiment, transmitting 906 the sequence of communications to each member of the call participant set may include synchronously transmitting the sequence of communications to at least a portion of the call participant set. In an embodiment, the portion of the call participant set to whom the sequence of communications are synchronously transmitted may include members of the call participant set that may be engaged in the call. Synchronously transmitting the sequence of communications may include transmitting the sequence of communications to the portion of the call participant set in real-time or near real-time.

In some embodiments, at least a portion of the call participant set may not be engaged in the call and/or may experience poor data connectivity, e.g., which may impede real-time participant in the call. In such a situation, transmitting 906 the sequence of communications to each member of the call participant set may include asynchronously transmitting the sequence of communications to at least a portion of the call participant set. Asynchronously transmitting the sequence of communications may include, for example, posting the sequence of communications for later retrieval by one or more members of the call participant set and/or for retrieval on an as available basis, e.g., which may be dictated, at least in part, by a data connectivity associated with the one or more members of the participant set.

Various suitable user interfaces may be implemented for receiving and interacting with the various individual communications associated with the call. In some embodiments, different user interface may be implemented, e.g., which may be amenable to particular data types of particular communications. According to some embodiments, multiple user interfaces may be concurrently accessible, e.g., which may permit different data types to be generated and/or interacted with. For example, a view-finder user interface may be implemented in connection with the capture of image or video data (e.g., via camera functionality associated with the computing device), while a web browser user interface may be implemented in connection with the capture of web links or data included within a website. Communication process 10 may receive 904 the data captured via the various suitable user interfaces. In a similar manner various user interfaces may be utilized in connection with the consumption of communications transmitted by communication process 10. User interfaces implemented in connection with communication process 10 may not only allow for the capture of communication and the consumption of communications from other users, but may also allow for interactions with the communications, such as manipulation, forwarding, and transforming the communications. In some embodiments, the various user interfaces may be accessed be scrolling (e.g., based on a swipe input gesture via a touch screen interface, or the like) laterally or vertically between different user interface screens or panes. It will be appreciated that various additional and/or alternative user interface may be similarly implemented in connection with a call including a sequence of communications that may include multiple different data types and/or multiple different media types.

In an embodiment, communication process 10 may record 912 the sequence of communications associated with the call. For example, recording the call may include storing the interactions in a suitable data store, e.g., which may be associated with server computer 18 and/or with another computing device. In an embodiment, the recorded 912 sequence of communication associated with the call may be accessible, e.g., to one or more the individuals included in the participant set associated with the channel. In an embodiment, recorded calls may be accessed, for example, via a web browser and/or using a custom application.

In an embodiment, recording 912 the call may include the use of tags and meta-data associated with the sequence of communications. For example, recording the sequence of communications associated with the call may include defining 914 an association between each of the communications of the sequence of communications and the call. For example, communication process 10 may define 914 a tag associated with each of the communications of the sequence of communication in the call. The defined 914 tag may identify each of the communications (e.g., individually and/or collectively) as being associated with the call. Accordingly, the record of the call may be based upon, at least in part, the communications tagged as belonging to a specific call. In an embodiment, each communication may further include a sequence tag and/or a time stamp that may, for example, indicate a chronological position of the communication within the call.

In an embodiment recording 912 the sequence of communications associated with the call may also include defining 916 an association between the call and the channel. For example, the association between the call and the channel may include a tag associated with each call (and/or associated with each communication tagged as being associated with a given call) that may identify the call (and/or each communication tagged as being associated with the call) as being associated with a given channel. As such, communication process 10 may tag each call as being associated with a particular channel.

Further, in an example embodiment, recording 912 the sequence of communications associated with the call may include defining 918 an association between each member of the call participant set and the channel. For example, communication process 10 may include a list of all members of the communication system. Communication process 10 may define 918 an association between each member who is included within the participant set of a channel and the channel itself. For example, communication process 10 may define 918 a tag associated with each member of the communication system facilitated by communication process 10, in which the tag may identify a channel for which the member is included within the participant set of the channel. In a situation in which a member of the communication system may be included in the participant set of more than one channel, the communication process 10 may define 918 a tag associated with a member for each channel that the member is included in the participant set.

In an embodiment, calls within a channel and/or communications within a call may be presented in a timeline manner. For example, via a user interface associated with a member of a communication system facilitated by communication process 10, communication process 10 may allow the member to identified one or more channels that the member is tagged as being associated with. Further, the individual channels may include a chronological representation of calls associated with each channel. In an embodiment, a selection of a call associated with a channel may give rise to a user interface including a chronological representation of the communications tagged as being associated with the call. In an embodiment, the representation of the communication tagged as being associated with the call may include the communication itself (e.g., for graphical communications such as text, pictures, or the like), and/or a representation of the communication that may be selected to consume the communication (e.g., to playback an audio recording or video recording, etc.). Various additional and/or alternative arrangements for presenting and/or accessing calls and/or communications may similarly be implemented.

In some embodiments, the content of calls may decay over time. For example, by default and/or by user preference, the content of calls (e.g., the individual communications making up the call) may expire after a defined period of time, after which the content may no longer be available. In an example embodiment, the decay of content of calls may include a progressive decrease in a resolution or quality of the content. For example, over time (e.g., based on defaults and/or user preference) the quality and/or resolution of communications may decrease. An example of a decreasing quality and/or resolution may include a decrease in image resolution associated with an image, a decrease in bit rate associated with an audio component, or the like. In an embodiment, users may explicitly select that certain calls be indefinitely retained so that they do not decay or degrade or be made inaccessible.

In an embodiment, communication process 10 may allow a call and/or one or more communications associated with a call (e.g., a portion of a call) to be published. For example, publishing a call and/or a portion of a call may include exporting (e.g., saving the contents, copying the contents, etc.) the call and/or the portion of a call to a location outside of the communication system facilitated by communication process 10. In some embodiments, publishing a call and/or a portion of a call may include allowing links to be established to the call and/or a portion of a call. For example, a link to a call and/or a portion of a call may allow the call and/or a portion of the call to be accessed from a location external to the communication system facilitated by communication process 10. For example, in an embodiment, a call via a channel including an implicit association of individuals having a point of intersection that may include a social networking group may be published to the social networking group, e.g., via the social networking website.

In an embodiment, recording 912 the sequence of communications associated with the call may include defining 920 an access control associated with the call. For example, communication process 10 may allow one, or more than one, member included in the participant set of the call to implement an access control, e.g., which may restrict publication and/or dissemination of communication associated with the call. In some embodiments, one or more default access controls may be associated with Additionally, while various embodiments and features have been described herein, it will be apparent to one having skill in the art that the various embodiments and features may be susceptible to combination with one another and/or to various additional/alternative combinations. All such combination of subject matter disclosed herein is intended to be contemplated by the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
receiving, on a processor, a request to initiate a call via a channel;
identifying, on the processor, a call participant set associated with the channel;
receiving, on the processor, a sequence of communications associated with the call, the sequence of communications including at least a real-time media data type, including real-time voice communications, and a posted data type, including one or more defined pieces of content for consumption by members of the call participant set, as communication exchanges between the call participant set; and transmitting, on the processor, the sequence of communications to the call, including transmitting the posted data type during the course of at least a portion of the real-time voice communication.

2. The method of claim 1, wherein identifying the call participant set associated with the channel includes accessing a predefined channel participant set associated with the channel.

3. The method of claim 1, wherein identifying the call participant set associated with the channel includes defining a channel participant set based on, at least in part, an implicit association of individuals.

4. The method of claim 1, wherein receiving the sequence of communications includes receiving the sequence of communications as real-time packetized data transmissions.

5. The method of claim 1, wherein the real-time media data type includes real-time audio data.

6. The method of claim 5, wherein the real-time audio data includes voice over IP data.

7. The method of claim 5, wherein the real-time audio data includes a burst audio transmission.

8. The method of claim 1, wherein the posted media data type includes one or more of video, images, text, web data, location data.

9. The method of claim 1, wherein transmitting the sequence of communications to the call includes transmitting the sequence of communications to each member of the call participant set.

10. The method of claim 9, wherein transmitting the sequence of communications to each member of the call participant set includes synchronously transmitting the sequence of communications to at least a portion of the call participant set.

11. The method of claim 9, wherein transmitting the sequence of communication to each member of the call participant set includes asynchronously transmitting the sequence of communications to at least a portion of the call participant set.

12. The method of claim 1, further including recording the sequence of communications associated with the call.

13. The method of claim 12, wherein recording the sequence of communications associated with the call includes defining an association between each of the communications of the sequence of communications and the call.

14. The method of claim 12, wherein recording the sequence of communications associated with the call includes defining an association between the call and the channel.

15. The method of claim 12, wherein recording the sequence of communications associated with the call includes defining an association between each member of the call participant set and the channel.

16. The method of claim 12, wherein recording the sequence of communications associated with the call includes defining an access control associated with the call.

17. A computer program product comprising a non-transitory computer readable medium having a plurality of instructions stored thereon, which, when executed by a processor, cause the processor to perform operations including:

receiving a request to initiate a call via a channel;

identifying a call participant set associated with the channel;

receiving a sequence of communications associated with the call, the sequence of communications including at least a real-time media data type, including real-time voice communications, and a posted data type, including one or more defined pieces of content for consumption by members of the call participant set, as communication exchanges between the call participant set; and transmitting the sequence of communications to the call, including transmitting the posted data type during the course of at least a portion of the real-time voice communication.

18. The computer program product of claim 17, wherein identifying the call participant set associated with the channel includes accessing a predefined channel participant set associated with the channel.

19. The computer program product of claim 17, wherein identifying the call participant set associated with the channel includes defining a channel participant set based on, at least in part, an implicit association of individuals.

20. The computer program product of claim 17, wherein receiving the sequence of communications includes receiving the sequence of communications as real-time packetized data transmissions.

21. The computer program product of claim 17, wherein the real-time media data type includes real-time audio data.

22. The computer program product of claim 21, wherein the real-time audio data includes voice over IP data.

23. The computer program product of claim 21, wherein the real-time audio data includes a burst audio transmission.

24. The computer program product of claim 17, wherein the posted media data type includes one or more of video, images, text, web data, location data.

25. The computer program product of claim 17, wherein transmitting the sequence of communications to the call includes transmitting the sequence of communications to each member of the call participant set.

26. The computer program product of claim 25, wherein transmitting the sequence of communications to each member of the call participant set includes synchronously transmitting the sequence of communications to at least a portion of the call participant set.

27. The computer program product of claim 25, wherein transmitting the sequence of communication to each member of the call participant set includes asynchronously transmitting the sequence of communications to at least a portion of the call participant set.

28. The computer program product of claim 17, further including instructions for recording the sequence of communications associated with the call.

29. The computer program product of claim 28, wherein recording the sequence of communications associated with the call includes defining an association between each of the communications of the sequence of communications and the call.

30. The computer program product of claim 28, wherein recording the sequence of communications associated with the call includes defining an association between the call and the channel.

31. The computer program product of claim 28, wherein recording the sequence of communications associated with the call includes defining an association between each member of the call participant set and the channel.

32. The computer program product of claim 28, wherein recording the sequence of communications associated with the call includes defining an access control associated with the call.

33. A computing system comprising a processor and a memory coupled with the processor, the processor and memory configured to perform operations comprising:
receiving a request to initiate a call via a channel;
identifying a call participant set associated with the channel;
receiving a sequence of communications associated with the call, the sequence of communications including at least a real-time media data type, including real-time voice communications, and a posted data type, including one or more defined pieces of content for consumption by members of the call participant set, as communication exchanges between the call participant set; and
transmitting the sequence of communications to the call, including transmitting the posted data type during the course of at least a portion of the real-time voice communication.

34. The computing system of claim 33, wherein identifying the call participant set associated with the channel includes accessing a predefined channel participant set associated with the channel.

35. The computing system of claim 33, wherein identifying the call participant set associated with the channel includes defining a channel participant set based on, at least in part, an implicit association of individuals.

36. The computing system of claim 33, wherein receiving the sequence of communications includes receiving the sequence of communications as real-time packetized data transmissions.

37. The computing system of claim 33, wherein the real-time media data type includes real-time audio data.

38. The computing system of claim 37, wherein the real-time audio data includes voice over IP data.

39. The computing system of claim 37, wherein the real-time audio data includes a burst audio transmission.

40. The computing system of claim 33, wherein the posted media data type includes one or more of video, images, text, web data, location data.

41. The computing system of claim 33, wherein transmitting the sequence of communications to the call includes transmitting the sequence of communications to each member of the call participant set.

42. The computing system of claim 41, wherein transmitting the sequence of communications to each member of the call participant set includes synchronously transmitting the sequence of communications to at least a portion of the call participant set.

43. The computing system of claim 41, wherein transmitting the sequence of communication to each member of the call participant set includes asynchronously transmitting the sequence of communications to at least a portion of the call participant set.

44. The computing system of claim 33, wherein the processor and memory are further configured for recording the sequence of communications associated with the call.

45. The computing system of claim 44, wherein recording the sequence of communications associated with the call includes defining an association between each of the communications of the sequence of communications and the call.

46. The computing system of claim 44, wherein recording the sequence of communications associated with the call includes defining an association between the call and the channel.

47. The computing system of claim 44, wherein recording the sequence of communications associated with the call includes defining an association between each member of the call participant set and the channel.

48. The computing system of claim 44, wherein recording the sequence of communications associated with the call includes defining an access control associated with the call.

* * * * *